United States Patent [19]

Ernst et al.

[11] 4,099,605
[45] Jul. 11, 1978

[54] CLUTCH RELEASE DEVICE

[75] Inventors: Horst Manfred Ernst, Eltingshausen; Armin Olschewski, Schweinfurt; Rainer Schürger, Schwanfeld; Lothar Walter, Schweinfurt; Manfred Brandenstein, Aschfeld; Erich Burkl, Stammheim, all of Fed. Rep. of Germany

[73] Assignee: SKF Industrial Trading & Development Company B.V., Nieuwegein, Netherlands

[21] Appl. No.: 728,941

[22] Filed: Oct. 4, 1976

[30] Foreign Application Priority Data

Oct. 30, 1975 [DE] Fed. Rep. of Germany ... 7534422[U]

[51] Int. Cl.² .................. F16D 19/00; F16D 11/00; F16D 13/60
[52] U.S. Cl. .................................. 192/98; 192/110 B
[58] Field of Search .......................... 192/98, 110 B

[56] References Cited

U.S. PATENT DOCUMENTS

| | | | |
|---|---|---|---|
| 3,882,979 | 5/1975 | Limbacher et al. | 192/110 B X |
| 3,985,215 | 10/1976 | Ernst et al. | 192/110 B X |
| 4,026,398 | 5/1977 | Matyschik et al. | 192/98 |
| 4,029,186 | 6/1977 | De Gennes | 192/98 |
| 4,033,440 | 7/1977 | Ladin | 192/98 |

Primary Examiner—Leonard H. Gerin
Attorney, Agent, or Firm—Daniel M. Rosen

[57] ABSTRACT

A clutch release device, particularly for motor vehicles, with a self-centering clutch thrust bearing, having a fixed bearing ring, and which is located with radial play with respect to a bearing support, and which has; a sliding sleeve forming the bearing support, an additional sleeve connected to the sliding sleeve, the fixed bearing ring nonrotatingly contacting a contact surface of the additional sleeve, means preventing the fixed bearing from rotating on the additional sleeve, the additional sleeve, at the area of contact with the contact surface, being offset in a direction toward the clutch thrust bearing, the additional sleeve, in the offset, having at least two diametrically opposed recesses for engaging fixed means located on the periphery of the fixed bearing ring for protecting the clutch release bearing from rotation with respect to the bearing support.

9 Claims, 3 Drawing Figures

SECTION - A-B

DETAIL OF Z

CLUTCH RELEASE DEVICE

THE INVENTION

The present invention relates to a clutch release device, as for motor vehicles, and more particularly to a clutch release device with a self-centering clutch thrust bearing.

Clutch release devices are known in the art wherein the clutch thrust bearing is located with radial play on or in a bearing support and which comprises a sliding sleeve and an additional sleeve connected thereto, with the fixed bearing ring contacting a contact surface of the additional sleeve and prevented from rotating by suitable means. With this known design, in order to prevent rotation, the contact flange of the additional sleeve is provided with a number of lugs which engage recesses in the radial flange of the outside ring with radial play. This known design has the disadvantage that the outside ring is weakened by the recesses. Furthermore, with this known arrangement, the flange of the outside ring must be kept in friction contact with the flange of the additional sleeve by means of special springs.

It is, therefore, an object of the present invention to provide a clutch release device which does not have the above-noted shortcomings of the known designs.

It is a further object of the present invention to provide a clutch release device which comprises components which can be easily assembled.

The foregoing objects of the present invention are achieved by providing that the additional sleeve, in contact with the contact surface, is offset in the direction toward the clutch thrust bearing. In the offset area, the additional sleeve is provided with at least two diametrically opposed recesses (cut-outs) which engage the lugs located on the periphery of the fixed bearing rings. According to a further improvement of the present invention, the additional sleeve is designed in such a way that the bore surface of the offset surrounds the flange of the fixed bearing ring with radial play. Furthermore, the difference between the width of the recesses in the additional sleeve and the width of the lugs engaging them is equal to or larger than the maximum radial play of the bearing in the bore area of the additional sleeve.

The foregoing objects and brief description, as well as further advantages of the present invention are provided in the following description of an embodiment, taken in conjunction with the appended drawing, wherein.

Figure 1:
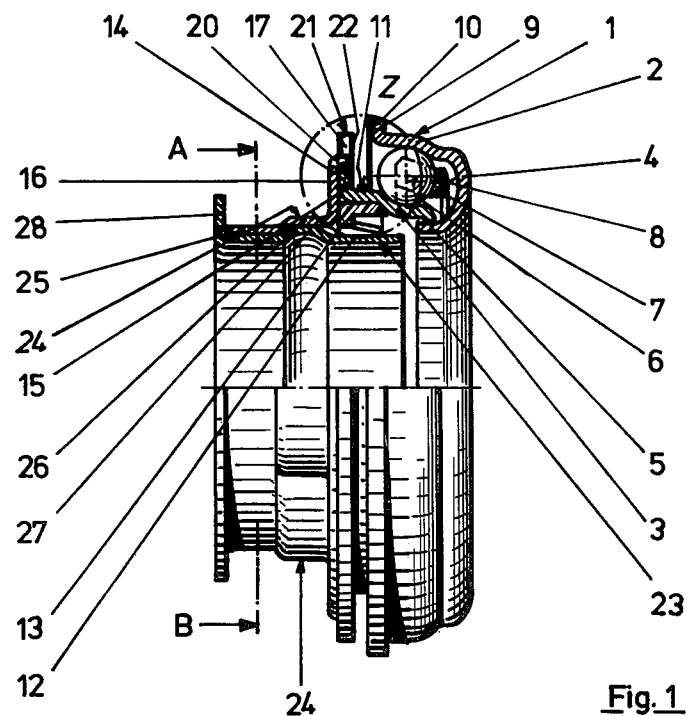
FIG. 1 shows a section through the clutch release device in accordance with the present invention.
Figure 2:
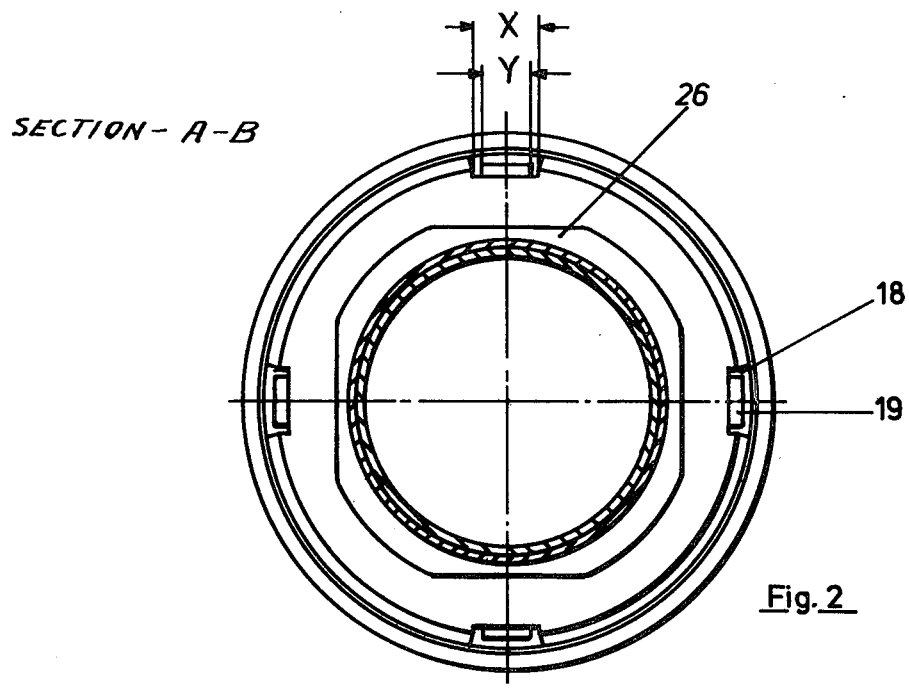
FIG. 2 shows a section taken along line A–B of FIG. 1.
Figure 3:
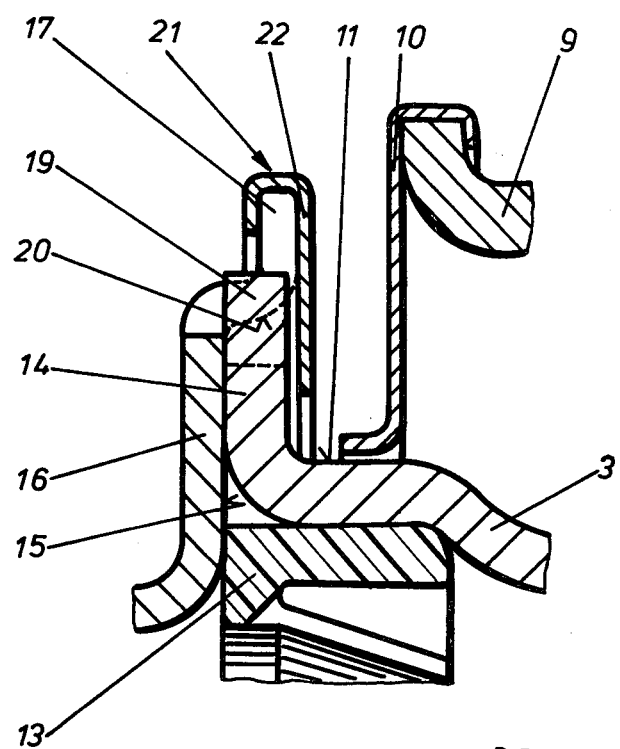
FIG. 3 shows detail Z.

Referring to FIGS. 1–3 there is shown a self-centering clutch thrust bearing 1 whose outside ring 2 and inside ring 3 are made of sheet metal. The outer ring 2 is provided with a convex flange 4 for the clutch spring (not shown) and has rim 5 inwardly bent in the axial direction. This rim 5 is beaded outwardly and engages the inside ring 3 with little play so that the bearing rings 2, 3, the balls 6, and the bearing cage 7 form an integral unit. The outer surface 8 of cage 7, which surface faces away from the balls 6, has about the same curvature as the convex contact flange 4 for the clutch spring, so that a uniform minimum distance between cage 7 and outside ring 2 is ensured. The radially outwardly bent rim 9 of outside ring 2 is held by a cover disk 10 which may be of sheet metal. The cover disk 10 extends almost to the axial jacket surface 11 of inside ring 3 and with it forms a labyrinth gap. The clutch thrust bearing 1 is mounted on a sliding sleeve 12 with a damping ring 13 between the bearing 1 and the sliding sleeve 12. This damping ring 13 absorbs the radial movement of bearing 1 when a certain play is exceeded and damps relative movement of the clutch thrust bearing 1 with respect to sliding sleeve 12. The inside ring 3 of clutch thrust bearing 1 has a radially outward directed flange 14 which contacts a radial contact surface 15 of the additional sleeve 16. At the contact surface 15, the rim of the additional sleeve 16 is offset by a section 17. The offset section 17 is provided, for example, with four recessed or cut-out areas 18. To prevent the clutch release bearing 1 from rotation, lugs 19, shown in FIG. 2, mounted on the circumference of flange 14, engage at least two diametrically opposed cut-outs 18. The bore surface 20 of the offset section 17, as shown in FIG. 3, limits the radial displacement of the bearing 1. The difference between width X of cut-out 18 and width Y of the lugs 19 is equal to or larger than the maximum radial play of the bearing in additional sleeve 16, so that the lugs 19 do not hinder the radial play of the bearing 1. On the radially outwardly angled section 17 of the additional sleeve 16, there is a sheet metal cap 21 which contacts that side of the flange 14 facing the clutch (not shown) with a radially inward section 22 and connects the bearing 1 to the bearing housing 23. The axial part 24 of the additional sleeve 16 has two sections 25, 26 with different diameters. Section 25 with the smaller diameter is rigidly attached to the sliding sleeve 12. Section 26 with the larger diameter engages a rim 27 pressed out of the sliding sleeve 12. The rim 27 holds the additional sleeve 16 solidly in the axial direction. After pressing the additional sleeve onto the sliding sleeve 12, rim 28 of sliding sleeve 12 is formed radially outward so that the additional sleeve 16 is form-locked to the sliding sleeve 12. Section 26 of additional sleeve 16 is square, as shown in FIG. 2. On this square, the clutch release fork (not shown) is mounted.

The embodiment described presents only an example of the clutch release device of the present invention. Variations in the construction of the individual components within the scope of the invention will be readily apparent to those skilled in the art.

What is claimed is:

1. A clutch release device including a self-centering clutch thrust bearing having a fixed bearing ring mounted for radial play with respect to a bearing support, said device comprising a sliding sleeve forming said bearing support, an additional sleeve connected to said sliding sleeve, said fixed bearing ring contacting a radially extending contact surface of said additional sleeve which faces said clutch thrust bearing, said additional sleeve, at an area radially spaced from the area of contact with said contact surface, being axially offset in a direction toward said clutch thrust bearing, said additional sleeve, in said offset, having at least two diametrically opposed recesses for engaging fixed means located on the periphery of said fixed bearing ring for preventing said fixed bearing ring from rotation with respect to said additional sleeve and bearing sleeve.

2. The clutch release device as defined in claim 1, wherein said additional sleeve includes a bore surface in said offset surrounding the periphery of said fixed bearing ring with radial play.

3. The clutch release device as defined in claim 1, wherein the difference between the width of said recess and the width of said fixed means is equal to or greater than the maximum radial play of said clutch release bearing.

4. The clutch release device as defined in claim 1, wherein said offset is a radially outward offset section of said additional sleeve and includes a sheet metal cap with a radial section contacting that side of said periphery facing said clutch, with clearance.

5. The clutch release device as defined in claim 1, wherein said additional sleeve has a portion that is square in section.

6. In a clutch release bearing device having a sliding sleeve, a clutch thrust bearing with first and second rings relatively rotatable with respect to one another, an additional sleeve affixed to said sliding sleeve, wherein said first ring is mounted for limited radial play with respect to said sliding sleeve while relative rotation therebetween is inhibited; the improvement wherein said additional sleeve and first ring have radially extending flanges positioned to contact one another, the radially extending flanges of said additional sleeve having a portion that is axially offset to extend radially outwardly of said radially extending flange of said first ring, the diameter of said offset portion being greater than the diameter of a substantial portion of the outer periphery of said first ring to permit relative radial play therebetween, said offset portion having a pair of diametrically opposite recesses, and lugs extending from the radially outer periphery of said first ring and into said recesses for inhibiting relative rotation between said first ring and said additional sleeve.

7. The clutch release bearing device of claim 6 wherein said lugs extend radially outward in the plane of said radially extending flange of said first ring.

8. The clutch release bearing device of claim 7 wherein the differences between the dimensions of said recesses and said lugs in the the circumferential direction is at least equal to the maximum radial play between said first ring and said offset portion of said additional sleeve, whereby limitation of said radial play by said lugs is inhibited.

9. The clutch release bearing device of claim 7 further comprising a cap on the radially outer section of said offset portion, said cap extending radially inwardly and having a portion in axial alinement with a surface of said radially extending flange of said ring that is in contact with said radially extending flange of said additional sleeve.

* * * * *